Patented July 28, 1931

1,816,287

UNITED STATES PATENT OFFICE

HANS JORDAN, OF BERLIN-STEGLITZ, GERMANY, ASSIGNOR TO SCHERING-KAHLBAUM AKTIENGESELLSCHAFT, OF BERLIN, GERMANY

PRODUCING ALKYL-ISOPROPYLENE-PHENOLS

No Drawing. Application filed August 8, 1927, Serial No. 211,637, and in Germany August 11, 1926.

My invention refers to the preparation of chemical products and more especially to products obtained by effecting decomposition of the products of condensation obtained from alkyl phenols and ketones. These products of condensation and the way of producing same were described in my copending application for patent of the United States Serial No. 200,289, and a method of effecting their decomposition by heating them to about 300° C., is disclosed in another copending application Serial No. 200,290.

I have now found that I can decompose these condensation products at considerably lower temperatures and obtain a greater yield of unsaturated phenols, if the heat treatment is carried through in the presence of a suitable catalyst. Only small quantities, say 0.1 per cent and even less, of a suitable metal are required, such as Al, Mg or Hg, or of compounds of such metals, for instance oxids, or better still their phenolates or the respective metal compounds of the phenols, which shall be formed, to reduce the temperature of decomposition as far as 180° C. or below. Such phenolates are obtainable in a manner well known per se by heating the metal or its oxide or hydroxide with the phenol in question. I prefer operating in vacuo, and instead of the condensation products, which would distil over in the absence of a catalyst, their products of decomposition will distil over.

Example 1

To the product obtained by condensing m-cresol and acetone with gaseous hydrochloric acid at a temperature slightly exceeding room temperature, expelling the cresol in excess with steam and distilling the residue in vacuo, as described in my copending application Serial No. 200,289 is added a solution of 0.1 per cent by weight of aluminum-3-methyl-6-isopropylene phenolate and the mixture is heated to about 180° C in vacuo. The distillation results in the formation of 3-methyl-6-isopropylene phenol to which some dimethyl cumaran is admixed.

The phenolate mentioned above can be replaced for instance by the corresponding magnesium compound or by aluminium phenolate, the result being the same in both cases.

Various changes may be made in the details disclosed in the foregoing specification without departing from the invention or sacrificing the advantages thereof.

The term "metal" in the claims is intended to include also any compound of such metal.

I claim:—

1. The process of producing methylisopropylene phenols comprising heating a compound of the formula

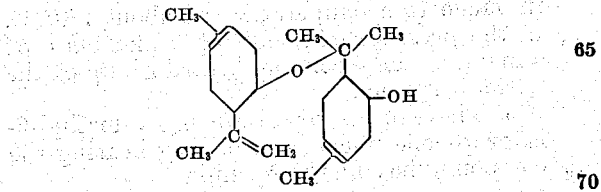

in the presence of a metal of the second and third group of the periodic system.

2. The process of producing methylisopropylene phenols comprising heating a compound of the formula

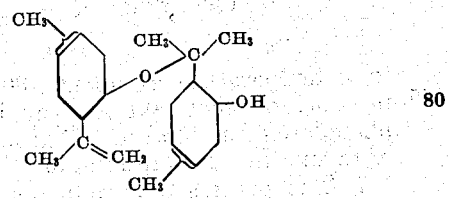

in the presence of a compound of a metal of the second and third group of the periodic system which is capable of forming a phenolate.

3. The process of producing methylisopropylene phenols comprising heating a compound of the formula

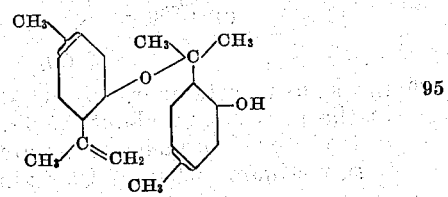

in the presence of a metal phenolate of the second and third group of the periodic system.

4. The process of producing 3-methyl-6-isopropylene phenol comprising heating a compound of the formula

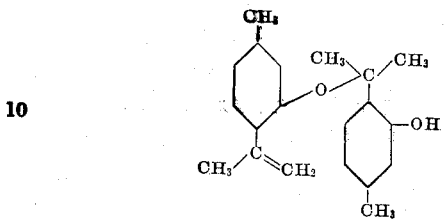

to a temperature of about 180° C. in the presence of about 0.1% aluminium phenolate.

5. The process of producing 3-methyl-6-isopropylene phenol comprising heating a compound of the formula

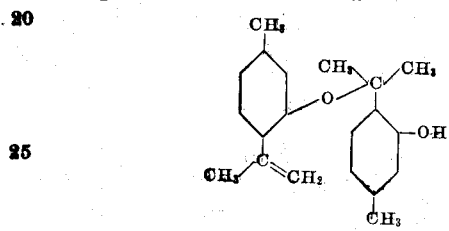

in vacuo to a temperature of about 180° C. in the presence of about 0.1% phenolate of a metal of the second and third group of the periodic system.

6. The process of producing 3-methyl-6-isopropylene phenol comprising heating the compound having the formula

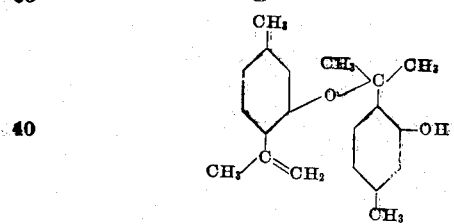

to a temperature of about 180° C. in the presence of about 0.1% of an isopropylene phenolate of a metal of the group consisting of magnesium and aluminum.

7. The process of producing 3-methyl-6-iso propylene phenol comprising heating the compound having the formula

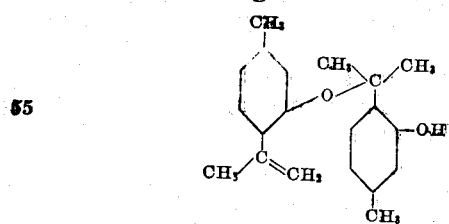

in vacuo to a temperature of about 180° C. in the presence of about 0.1% aluminum-3-methyl-6-isopropylene phenolate.

In testimony whereof I affix my signature.

HANS JORDAN.